United States Patent [19]

Miyoshi et al.

[11] Patent Number: 4,687,706
[45] Date of Patent: Aug. 18, 1987

[54] MAGNETIC RECORDING MEDIUM

[75] Inventors: Takahito Miyoshi; Toshimitu Okutsu; Masaaki Fujiyama, all of Kanagawa, Japan

[73] Assignee: Fuji Photo Film Co., Ltd., Kanagawa, Japan

[21] Appl. No.: 599,117

[22] Filed: Apr. 11, 1984

[30] Foreign Application Priority Data

Apr. 11, 1983 [JP] Japan .................................. 58-63411

[51] Int. Cl.$^4$ ................................................ G11B 5/72
[52] U.S. Cl. ....................................... 428/330; 427/44; 427/128; 427/131; 427/132; 428/323; 428/328; 428/329; 428/694; 428/900
[58] Field of Search ............... 428/694, 900, 328, 329, 428/323, 330, 336; 427/131, 132, 128, 44; 360/134–136

[56] References Cited

U.S. PATENT DOCUMENTS

| | | | |
|---|---|---|---|
| 4,367,261 | 1/1983 | Miyoshi | 428/694 |
| 4,388,360 | 6/1983 | Miyoshi | 428/694 |
| 4,411,953 | 10/1983 | Miyoshi | 428/336 |
| 4,414,270 | 11/1983 | Miyoshi | 428/694 |
| 4,427,738 | 1/1984 | Fujiyama | 428/900 |
| 4,474,843 | 10/1984 | Miyoshi | 428/694 |
| 4,544,601 | 10/1985 | Yamaguchi | 428/323 |
| 4,552,807 | 11/1985 | Yamada | 428/694 |
| 4,555,431 | 11/1985 | Miyatsuka | 427/131 |
| 4,582,757 | 4/1986 | Miyoshi | 428/694 |
| 4,592,952 | 6/1986 | Miyoshi | 428/323 |
| 4,600,638 | 7/1986 | Ishikuro | 428/323 |
| 4,612,235 | 9/1986 | Ushimaru | 428/216 |

*Primary Examiner*—Ellis P. Robinson
*Attorney, Agent, or Firm*—Sughrue, Mion, Zinn, Macpeak, and Seas

[57] ABSTRACT

A magnetic recording medium is disclosed which comprises a non-magnetic support having magnetic recording layer on one surface thereof, and a backing layer on the surface opposite the magnetic recording layer, the backing layer containing inorganic particles having an average particle size of 0.02 μm or less.

10 Claims, 2 Drawing Figures

MAGNETIC RECORDING MEDIUM

FIELD OF THE INVENTION

The present invention relates to a magnetic recording medium, and more particularly it relates to a magnetic recording tape having a decreased abrasion coefficient without being accompanied by a decrease in the S/N, an improved running durability and less drop out and less edge bend of the tape.

BACKGROUND OF THE INVENTION

A magnetic recording tape used as an audio tape, a video tape or a computer tape has a smooth magnetic recording layer surface in order to improve the sensitivity thereof, particularly in terms of output at a high frequency range. However, the magnetic recording tape having a smooth surface is often wound irregularly during winding and rewinding. When such a tape is used, the running properties are poor due to changes in tension, and this causes changes in the output. Further, the tape tends to be easily deformed and damaged. A magnetic recording tape having a backing layer which is provided on the surface of the support opposite to the magnetic recording layer has been proposed to remove the above-described problems.

However, when a backing layer having an uneven surface is provided in order to improve the running properties and running durability as described in Japanese Patent Publication No. 4243/79, it is known that the surface property of the magnetic recording medium (particularly, in the tape form) deteriorates. That is, when the magnetic recording tape is wound in a roll form or the magnetic recording sheets are piled, unevenness of the backing layer is transferred to the surface of the magnetic recording layer, causing damage of surface properties of the layer whereby electromagnetic properties, particularly the S/N characteristic of the magnetic recording medium are deteriorated.

SUMMARY OF THE INVENTION

An object of the present invention is to provide a magnetic recording medium having a high S/N, less drop out and excellent running properties.

The above object can be achieved by a magnetic recording medium comprising a non-magnetic support having coated on one surface thereof, a magnetic recording layer and a backing layer on opposite surface thereof, said backing layer containing inorganic particle having an average particle size of 0.02 μm or less dispersed in a binder.

DETAILED DESCRIPTION OF THE INVENTION

Figure 1:
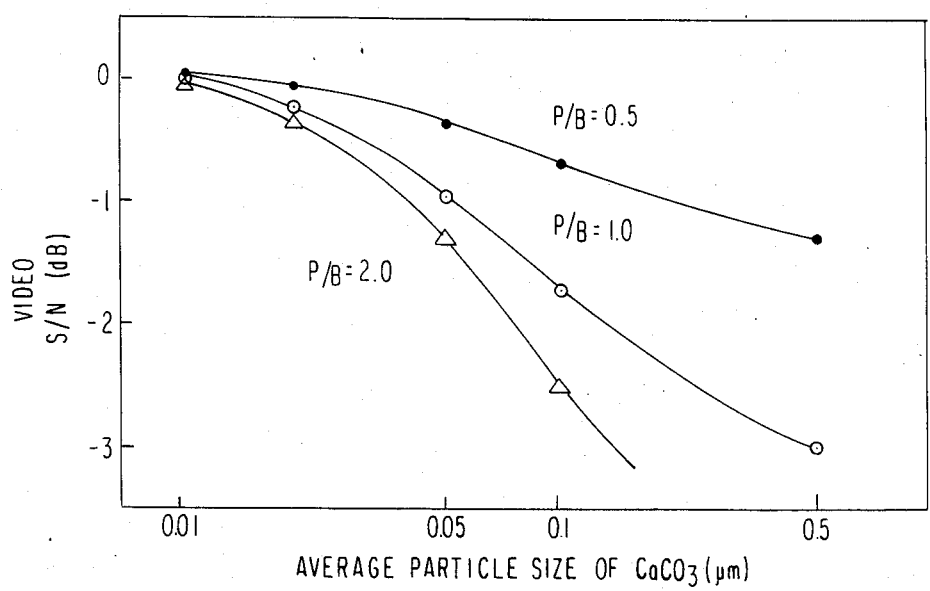
FIG. 1 is a graph showing the relationship between the average particle size of $CaCO_3$ and the video S/N.

The type and shape of inorganic particles should be carefully selected in order to obtain a backing layer which does not adversely affect the magnetic recording layer. Particularly, the size, hardness and shape of inorganic particles should be carefully selected.

Inorganic particles which can be used in the backing layer of this invention include carbon black particles, graphite, tungsten disulfide, molybdenum disulfide, boron nitride, silicone dioxide, calcium carbonate, aluminum oxide, iron oxide, titanium dioxide, magnesium oxide, zinc oxide, calcium oxide, lithopone, talc and stannic oxide. These inorganic particles can be used alone or in admixture.

The inorganic particles preferably have an average particle size of 0.02 μm or less, more preferably 0.005 to 0.02 μm and a Mohs hardness of 2 to 8, preferably 3 to 7. Particularly preferred inorganic particles are fine calcium carbonate particles which meet the above requirements.

The inorganic particles can be tabular, granular, acicular, etc. Tabular and granular particles are preferred. Most preferred shape is granular.

Binders which can be used in the backing layer can be any binders which are well known in the art such as thermoplastic resins, thermosetting resins, reactive type resins and mixtures thereof.

Useful thermoplastic resins include a vinyl chloride-vinyl acetate copolymer, a vinyl chloride-vinylidene chloride copolymer, a vinyl chloride-acrylonitrile copolymer, an acrylate-acrylonitrile copolymer, an acrylate-vinylidene dene chloride copolymer, an acrylate-styrene copolymer, a methacrylate-acrylonitrile copolymer, a methacrylate-vinylidene chloride copolymer, a methacrylate-styrene copolymer, a polyurethane elastomer, polyvinyl fluoride, a vinylidene chloride-acrylonitrile copolymer, a butadiene-acrylonitrile copolymer, a polyamide resin, polyvinyl butyral, a cellulose type resin (cellulose acetate butyrate, cellulose diacetate, cellulose propionate, nitrocellulose, and the like), a styrene-butadiene copolymer, a polyester resin, a chlorovinyl ether-acrylate copolymer, an amino resin and various rubber type resins as described in, for example, U.S. Pat. No. 4,414,270.

Useful thermosetting resins or reactive type resins include a phenol resin, an epoxy resin, a polyurethane hardenable resin, a urea resin, a melamine resin, an alkyd resin, an acryl type reactive resin, polyisocyanate and polyamine as described in, for example, U.S. Pat. No. 4,414,270.

Of these resins, a cellulose type resin, a thermoplastic polyurethane elastomer and polyisocyanate are most preferred.

A preferred cellulose type resin is a cellulose derivative such as nitrocellulose which is useful for providing heat resistance, flexibility and blocking resistance.

Thermoplastic polyurethane elastomers can be any commercially available elastomers. That is, the thermoplastic polyurethane elastomer includes polyester polyurethane resins which can be obtained by urethane formation between (1) polyester polyols which are obtained by the reaction of organic dibasic acids such as phthalic acid, adipic acid, dimerized linolic acid or maleic acid with glycols such as ethylene glycol, propylene glycol, butylene glycol or diethylene glycol, or with polyhydric alcohols such as trimethylolpropane, hexanetriol, glycerine, trimethylolethane or pentaerythritol, and (2) polyisocyanate compounds such as tolylene diisocyanate, 4,4'-diphenylmethane diisocyanate, hexamethylene diisocyanate or methaxylene diisocyanate; polyether polyurethane resins which can be obtained by urethane formation between (1) polyether polyols having an ether bond such as polyoxypropylene glycols, polyoxypropylene-polyoxyethylene glycols and (2) various polyisocyanate compounds; and the compound having a

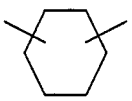

ring and/or a

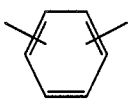

ring in a molecular skeleton represented by the following formula [I]:

[–(-O—R—OOC—R$^1$—CO)$_{\overline{m}}$OROOCNH—R-$^2$—NHCO—]  [I]

wherein m is an integer of from 5 to 100, R is a divalent group derived from an alicyclic or aromatic compound having at least two hydroxyalkyl groups or hydroxyalkoxyl groups having 1 to 4 carbon atoms,

R$^2$ is

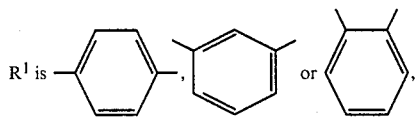

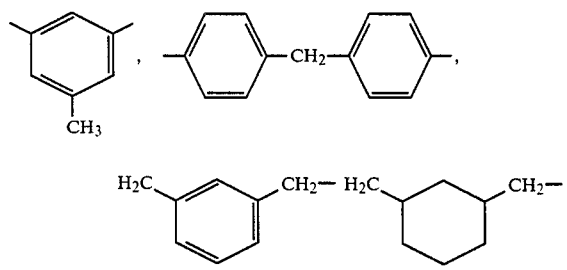

or –(-CH$_2$-)–, and n is an integer of from 4 to 6.

These compounds have a molecular weight of 5,000 to 500,000, preferably 10,000 to 200,000. These polyurethanes are disclosed in Japanese Patent Application (OPI) No. 122234/80.

Further, polyisocyanates as examples of the thermoplastic resins or reactive type resins include 2,4-tolylene diisocyanate, 1,6-hexabutylene diisocyanate, triisocyanate (e.g., "Coronate-L" manufactured by Nihon Polyurethane Industries Co., Ltd.).

The binder preferably has a composition comprising 20 to 80 parts by weight of a cellulose resin, 10 to 50 parts by weight of a thermoplastic polyurethane elastomer and 10 to 50 parts by weight of a polyisocyanate based on 100 parts by weight of the total binder.

The weight ratio of the inorganic particles and the binder (hereinafter P/B) used for the backing layer in this invention is 2/1 to 0.1/1, preferably 1/1 to 0.1/1. When this ratio is smaller than 0.1/1, the running property of a magnetic recording medium becomes unsatisfactory although smaller P/B leads to more improved video S/N.

The thickness of the backing layer in this invention is selected so that the total thickness (magnetic recording layer+support+backing layer) of the magnetic recording medium should be as thin as possible and is preferably 0.3 to 1.5 μ.

Satisfactory results can be obtained when the surface roughness of the backing layer is not higher than 0.024 μm in terms of an average center line roughness (Ra) at a cut off value of 0.08 mm.

The surface roughness can be controlled, for example, by selecting the particle size and dispersibility of the inorganic particles. When the dispersibility is the same, smaller particle size results in lower Ra. On the other hand, when the particle size is the same, high dispersibility gives rise to lower Ra.

In the conventional technique, if a backing layer is made thinner, the backing layer is easily damaged (i.e., the backing layer is scraped away when the magnetic recording medium runs), but the present invention does not have such problems. Further, the video S/N does not deteriorate even in high density recording at a wavelength of 1.3 μm or below by using the backing layer according to the present invention.

The magnetic recording medium of this invention can be prepared using the same material and in the same manner as disclosed in Japanese Patent Application (OPI) No. 108804/77.

This invention will be illustrated in greater detail by the following example, but is not limited thereto. In Example, all parts are by weight.

EXAMPLE

A magnetic recording layer containing a cobalt containing γ-Fe$_2$O$_3$ was provided on one surface of a polyethylene terephthalate support having a thickness of 14 μ, and a backing layer was provided on the surface opposite the magnetic recording layer. The magnetic recording layer was provided in a dry thickness of 5 μ. The backing layer was provided in the following manner. A mixture having the following composition was dispersed by a ball mill for 20 hours.

| | |
|---|---|
| Nitrocellulose | 35 parts |
| Polyurethane ("Nipporan 2301" manufactured by Nihon Polyurethane Co., Ltd.) | 20 parts |
| Polyisocyanate ("Coronate-L" manufactured by Nihon Polyurethane Co., Ltd.) | 45 parts |
| CaCO$_3$ particles (predetermined particle size) | Predetermined amount |
| Methyl ethyl ketone | 300 parts |
| Toluene | 50 parts |

The above dispersion was used as a coating composition for a backing layer and was coated to prepare a backing layer in a dry thickness of 8 μ.

The resulting magnetic recording medium was tested according to the evaluation methods described below and the results obtained are shown in FIG. 1.

Figure 2:
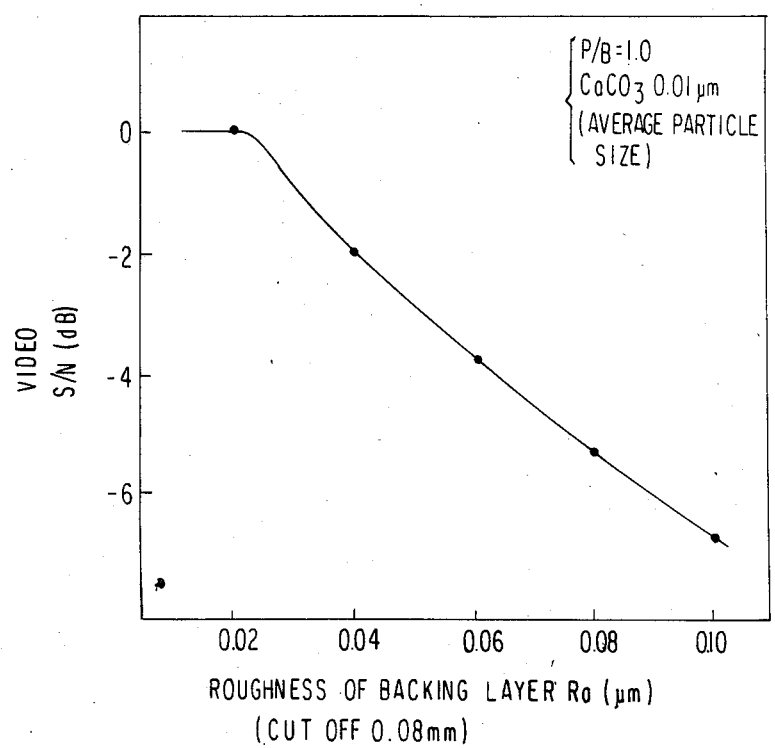
FIG. 2 is a graph showing the relationship between the surface roughness (Ra) of a backing layer and the video S/N.

Also, the results obtained by changing the dispersing conditions and the surface roughness of the backing layer are shown in FIG. 2.

Measurement of Video S/N

The video S/N was measured by a noise meter "925C" manufactured by Shibasoku Co., Ltd. A tape provided with a backing layer having a P/B ratio of 0.5 and an average particle size of CaCO$_3$ particles of 0.01

μm was used as a standard tape and the difference in the video S/N ratio between the test tape and the standard tape was measured.

The noise level was measured by a 10 KHz high pass filter and a 4 MHz low pass filter. The VTR used in this Example was "NV-8300" manufactured by Matsushita Electric Industries Co., Ltd.

It is clear from FIG. 1 that a tape having excellent electromagnetic properties can be obtained with a backing layer containing $CaCO_3$ particles having an average particle size of 0.02 μm or less.

It is clear from FIG. 2 that a tape having excellent electromagnetic properties can be obtained with a backing layer having excellent surface roughness, i.e., a smooth backing layer.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a non-magnetic support having a magnetic recording layer on one surface thereof, and a backing layer on the surface opposite the magnetic recording layer, said backing layer containing calcium carbonate particles having an average particle size of 0.005 μm to 0.01 μm dispersed in a binder, wherein said calcium carbonate particles have a Mohs hardness of 3 to 7 and wherein the backing layer has a thickness of 0.3 to 1.5μ.

2. The magnetic recording medium as claimed in claim 1, wherein said binder is selected from the group consisting of thermoplastic resins, thermosetting resins, reactive-type resins, and mixtures thereof.

3. The magnetic recording medium as claimed in claim 1, wherein the weight ratio of the calcium carbonate particles to binder is 2/1 to 0.1/1.

4. The magnetic recording medium as claimed in claim 3, wherein the weight ratio of the calcium carbonate particles to binder is 1/1 to 0.1/1.

5. The magnetic recording medium as claimed in claim 1, wherein the backing layer has a surface roughness in terms of an average center line roughness (Ra) and a cut-off value of 0.08 mm of not greater than 0.024 μm.

6. A magnetic recording medium comprising a non-magnetic support having a magnetic recording layer on one surface thereof, and a backing layer on the surface opposite the magnetic recording layer, said backing layer containing calcium carbonate particles as the only particles present in the backing layer, the calcium carbonate particles having an average particle size of 0.005 μm to less than 0.02 μm and being dispersed in a binder, wherein said calcium carbonate particles have a Mohs hardness of 3 to 7 and wherein the backing layer has a thickness of 0.3 to 1.5μ.

7. The magnetic recording medium as claimed in claim 6, wherein said binder is selected from the group consisting of thermoplastic resins, thermosetting resins, reactive-type resins and mixtures thereof.

8. The magnetic recording medium as claimed in claim 6, wherein the weight ratio of the calcium carbonate to binder is 2/1 to 0.1/1.

9. The magnetic recording medium as claimed in claim 8, wherein the weight ratio of the calcium carbonate to binder is 1/1 to 0.1/1.

10. The magnetic recording medium as claimed in claim 6, wherein the backing layer has a surface roughness in terms of an average center line roughness (Ra) and a cut-off value of 0.08 mm of not greater than 0.024 μm.

* * * * *